United States Patent
Nishimura

(10) Patent No.: US 6,873,068 B2
(45) Date of Patent: Mar. 29, 2005

(54) STEPPING MOTOR

(75) Inventor: Kiyoshi Nishimura, Nagano (JP)

(73) Assignee: Sankyo Seiki Mfg. Co., Ltd., Nagano (JP)

(*) Notice: Subject to any disclaimer, the term of this patent is extended or adjusted under 35 U.S.C. 154(b) by 221 days.

(21) Appl. No.: 10/367,659

(22) Filed: Feb. 14, 2003

(65) Prior Publication Data

US 2003/0168922 A1 Sep. 11, 2003

(30) Foreign Application Priority Data

Feb. 15, 2002 (JP) ........................................ 2002-038505

(51) Int. Cl.[7] ............................................. H02K 37/00
(52) U.S. Cl. ................................ 310/49 R; 310/156.45; 310/257; 310/254
(58) Field of Search .......................... 310/49 R, 156.38, 310/156.45, 156.01, 254, 259, 257

(56) References Cited

U.S. PATENT DOCUMENTS

| | | | | |
|---|---|---|---|---|
| 3,777,196 A | * | 12/1973 | Field, II ................. | 310/156.64 |
| 4,347,457 A | * | 8/1982 | Sakamoto ................... | 310/256 |
| 4,406,958 A | * | 9/1983 | Palmero et al. .......... | 310/49 R |
| 4,739,201 A | * | 4/1988 | Brigham et al. .......... | 310/49 R |
| 4,831,301 A | * | 5/1989 | Neumann .................... | 310/216 |
| 4,933,585 A | * | 6/1990 | Rossi .......................... | 310/162 |
| 4,983,867 A | * | 1/1991 | Sakamoto ................. | 310/49 R |
| 6,057,613 A | * | 5/2000 | Trago ....................... | 310/49 R |

* cited by examiner

Primary Examiner—Thanh Lam
(74) Attorney, Agent, or Firm—Hogan & Hartson, LLP

(57) ABSTRACT

A stepping motor includes a stator whose outer diameter is 8 mm or less and a rotor having a magnet disposed opposing to the stator. The stator has a core with pole teeth formed therein. The ratio between the thickness of the pole teeth formed in the core in the radial direction on the stator side and an outer diameter of the magnet on the rotor side, in other words, the quotient derived by dividing the thickness of the pole teeth by the outer diameter of the magnet, is set in a range between 0.121 and 0.148 to achieve good torque characteristic and linearity.

6 Claims, 3 Drawing Sheets

STEPPING MOTOR

BACKGROUND OF THE INVENTION

1. Field of the Invention

The present invention relates to stepping motors, and more particularly to stepping motors in small sizes whose stator outer diameter is 8 mm or less.

2. Related Background Art

In conventional small-sized stepping motors, a ratio (R) between the thickness (t) of pole teeth formed on a stator core and an outer diameter (D) of a rotor magnet is typically 0.8 through 0.12 (R=0.8 through 0.12). Many of the stepping motors on the market have the ratio R ranging between 0.14 and 0.119 (R=0.14 through 0.119).

Small-sized stepping motors that are used in small device, such as, for example, notebook type personal computers are in a generally oval shape whose external diameter is 8 mm or less (shorter width is 6.5 mm or less). Since small-sized stepping motors have tight spatial restrictions, they have been developed with an emphasis on improvements of their torque for the necessity to satisfy torque requirements.

It is important to secure a good torque characteristic in miniaturizing motors. However, if the emphasis is placed only on securing the torque characteristic in designing stepping motors, the linearity characteristic, which is a unique characteristic of stepping motors, may deteriorate.

In other words, the magnetomotive force of both of the rotor and stator may preferably be made greater in view of securing the torque characteristic. To improve the magnetomotive force of the stator, a coil volume of coils that are wound on a bobbin inside a core of the stator may be increased. To increase the coil volume, the thickness of pole teeth formed on the core may be reduced, which is believed to cause the aforementioned problem of deteriorated linearity characteristic.

The inventor of the present invention has conducted experiments and discovered that the linearity characteristic of stepping motors deteriorated because the magnetic paths formed by the pole teeth are saturated as a result of thinning the pole teeth.

The deterioration of the linearity characteristic that is caused by thinned pole teeth may not pose a major problem in large-sized stopping motors. However, only when stepping motors are miniaturized, the deterioration of the linearity characteristic becomes significant, and therefore such problems provide a peculiar blind spot in designing stepping motors.

SUMMARY OF THE INVENTION

The present invention relates to optimization of rotor and stator in a motor to securely achieve the torque characteristic and linearity characteristic.

An embodiment of the present invention relates to a stepping motor having a stator whose outer diameter is, for example, 8 mm or less, wherein a ratio between the thickness of pole teeth formed in a core on the side of the stator and an outer diameter of a magnet on the side of a rotor, in other words, the quotient obtained by dividing the thickness of the pole teeth by the outer diameter of the magnet, is in a range between about 0.121 and about 0.143.

In another aspect of the present invention, a method for manufacturing a stepping motor whose outer diameter is, for example, 8 mm or less, is provided. The method includes the step of setting a quotient derived by dividing the thickness of the pole teeth by the outer diameter of the magnet in a range between about 0.121 and about 0.143.

Other features and advantages of the invention will be apparent from the following detailed description, taken in conjunction with the accompanying drawings that illustrate, by way of example, various features of embodiments of the invention.

DESCRIPTION OF PREFERRED EMBODIMENTS

Figure 1:
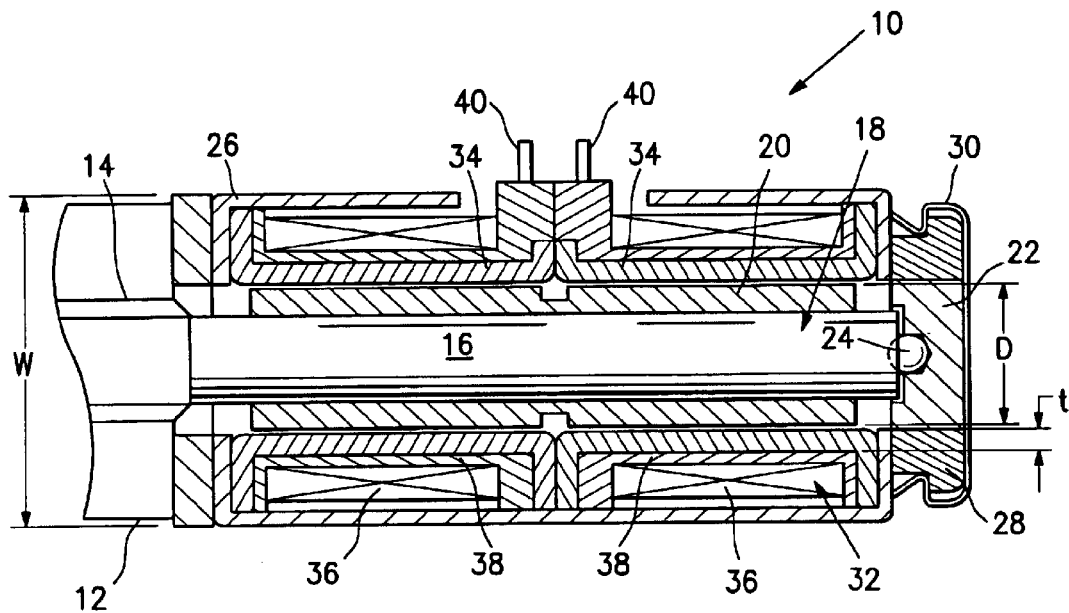
FIG. 1 schematically shows a side view with a cross section of a stepping motor in accordance with an embodiment of the present invention.

A stepping motor 10 in accordance with an embodiment of the present invention is described below with reference to the accompanying drawings. FIG. 1 shows a cross section of a side view taken along a rotor axis of the stepping motor 10 in accordance with the present embodiment. The stepping motor 10 is equipped with a frame 12, a main screw 14 that is provided in a center of the frame 12 and drives a device such as an optical pickup device or the like, and a main shaft 16 that is connected to the main screw 14 in a unitary fashion. A magnet 20 having a predetermined outer diameter D is fixedly mounted on the outer circumference of the main shaft 16, which in combination with the magnet 20 forms a rotor 18.

The main shaft 16 of the rotor 18 has one end that is freely rotatably supported in a radial direction by a steel ball 24 that is embedded in a bearing section 22, and is also supported in a thrust direction. The rotor 18 is housed inside a case 26. A cap 28 is affixed to an end surface of the case 26. The bearing section 22 is slidably inserted in a through hole provided in a central area of the cap 28 that is affixed to one end surface of the case 26. Movements of the bearing section 22 is restricted by a leaf spring 30 that is fixed on the outer circumference of the cap 28. The flexibility of the leaf spring 30 acts to absorb sudden thrust movements or forces of the frame 12 that may be caused by external disturbances. On the other hand, the other end of the main shaft 16 is supported by an appropriate bearing provided in a device on which the motor 10 is mounted.

A stator 32 is formed from cores 38, which are composed of coils 36 wound on bobbins 34. The stator 32 is concentrically provided around the rotor 18 in a manner that a minute uniform air gap is formed between the inner circumference of the stator 32 and the outer circumference of the rotor magnet 20. Pole teeth are formed in appropriate portions of the cores 38. For example, in accordance with the present embodiment, the thickness of the pole teeth may be equal to the thickness t of the core 38. Terminals 40 that are lead out of the bobbins 34 are electrically conductive with the coils 36 and connected to a control device (not shown) to receive electrical signals.

In the motor 10, the main shaft 16 of the rotor 18 directly connects to the main screw 14 to directly transmit rotational power to the main screw 14, and the torque of the motor is not increased by a reducing mechanism. Therefore, the rotor 18 must directly output a driving torque that is required to move the pickup device at required speeds. The magnetomotive force generated and outputted by the rotor 18 is determined by components such as a volume of magnetic paths, a stator-side (i.e., coil-side) magnetomotive force and a rotor-side (i.e., magnet-side) magnetomotive force.

For example, when the stepping motor 10 is used for moving a pickup of an optical pickup device for reading an optical disk on a notebook type personal computer, the case 26 of the stepping motor 10 is in a generally oval shape whose outer diameter across its arcuate sections is about 7.6 mm and outer width W across its relatively flat sections is about 6 mm.

These external measurements of the case 26 include the thickness of the case 26 itself, which means that the inner space of the case 26 is even smaller. While the magnet 20 needs to secure an outer diameter that generates a sufficient magnetomotive force necessary for a required torque characteristic within the inner space of the case 26, the coil 36 also needs to secure a sufficient number of coil windings that contribute to the (coil's) magnetomotive force on the side of the stator 32. In addition, the stepping motor 10 requires a good linearity characteristic as another important control characteristic, particularly when it is used for moving a pickup of an optical pickup device for reading an optical disk.

To analyze the torque characteristic and linearity characteristic, the following simplification of mutual relation of the two may be employed. The magnitude of the magnetomotive force on the side of the stator 32, which is one component of the torque output of the rotor 18, is represented by the thickness t of the pole teeth 38 (i.e., the core), the magnitude of the magnetomotive force on the side of the rotor (i.e., the magnet 20), which is another component of the torque output of the rotor 18, is represented by the outer diameter D of the magnet 20, and relations between the magnetomotive force on the side of the stator 32 and the magnitude of the magnetomotive force on the side of the rotor are expressed as ratios between the thickness t of the pole teeth 38 and the outer diameter D of the magnet 20.

Figure 2:
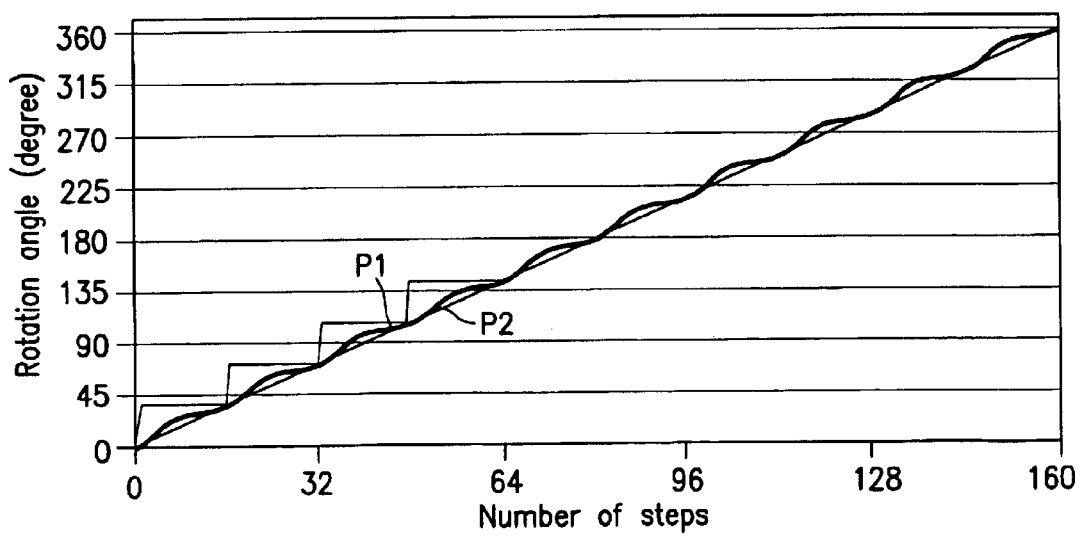
FIG. 2 shows a graph indicating an example in which a stepping motor shown in FIG. 1 presents a poor linearity.

In the case of a typical conventional stepping motor whose t/D is 0.11, for example, relations between the number of steps of input pulses and rotation angles present a step-like characteristic as indicated in FIG. 2. Relations between the number of steps of input pulses and rotation angles of a stepping motor at the time of micro-stepping ideally present a linear characteristic, in other words, the linearity characteristic of the motor is ideally linear. However, for example, a section p1 of the graph in FIG. 2 extends generally horizontal, which means that the rotor 18 is scarcely moving. Then, at a section p2 of the graph which comes right after the section 1, the graph sharply rises, which means that the rotor 18 moves excessively. In moving the pickup for reading an optical disk to a specified location, an accurate positioning of the frame 12 to locate the pickup at the specified location cannot be attained by designating the number of pulses due to this irregularity in rotation of the rotor 18, and a smooth reproduction cannot be performed.

It is believed that this non-linear characteristic is created because the thickness of the pole teeth (core) 38 is reduced, the reduced thickness of the pole teeth results in magnetic saturation, and leaked magnetic flux is not effectively used for the torque output.

If the magnetomotive force on the side of the rotor (i.e. the magnet 20) is restricted such that the amount of magnetic flux is reduced so as not to cause the magnetic saturation, the linearity characteristic improves, but the output torque characteristic deteriorates. To solve this problem, the thickness t of the pole teeth (core) 38 is adjusted so that the magnetomotive force on the side of the rotor (magnet 20) is effectively used, the output torque characteristic is sufficiently secured, and an effective magnetomotive force is created on the side of the stator 32 without causing a magnetic saturation that disturbs the linearity characteristic.

Figure 3:
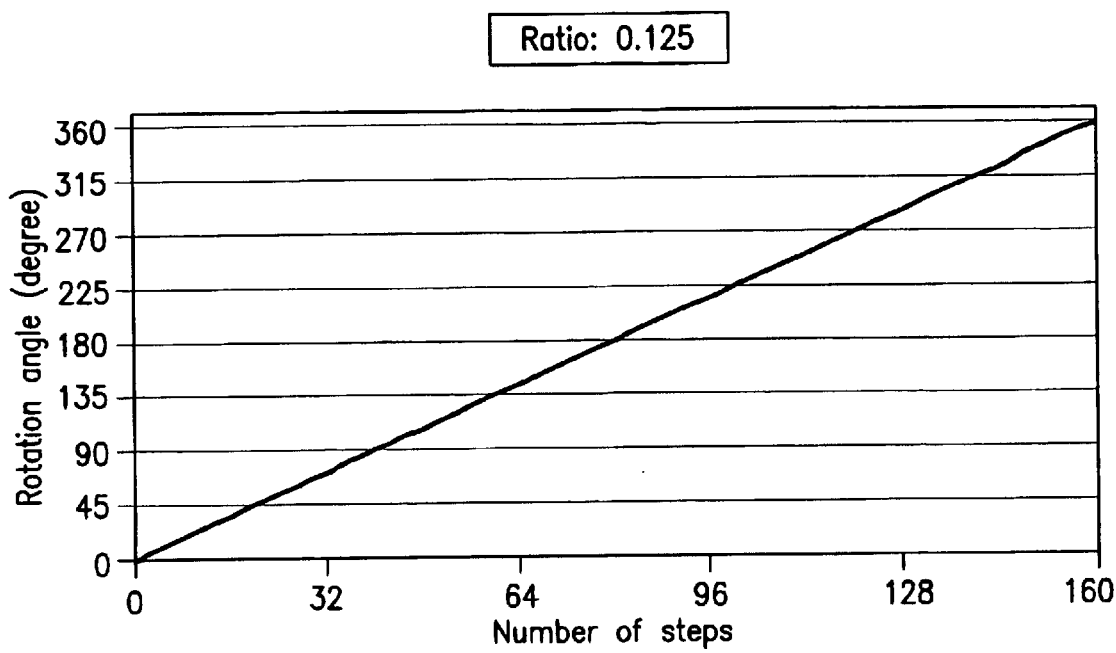
FIG. 3 shows a graph indicating an example in which a stepping motor shown in FIG. 1 presents a good linearity.

Experiments were conducted on stepping motors with magnets having an outer diameter D ranging between 3.17 mm and 3.23 mm, and a length L being at 12.8 mm, and pole teeth (core) 38 having a thickness t ranging between 0.40 mm and 0.45 mm. As a result, the relation between the number of steps of input pulses and rotational angles at a ratio t/D=0.125 presents generally a linear characteristic as shown in FIG. 3.

Figure 4:
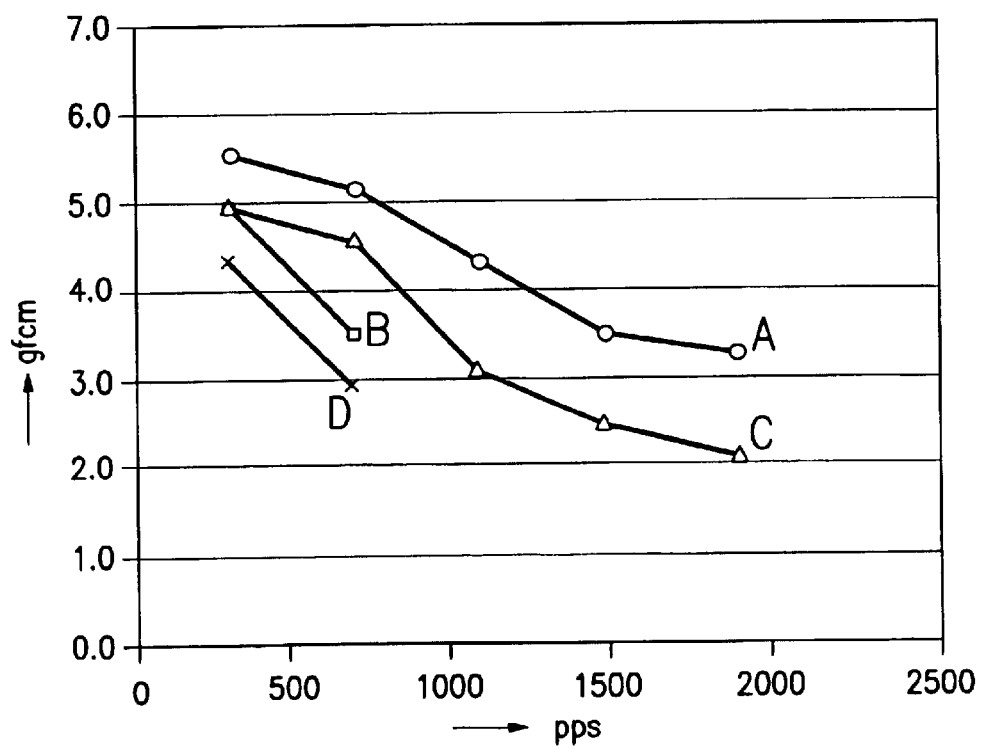
FIG. 4 shows a torque characteristics graph indicating poor torque characteristics and good characteristics of stepping motors with different stator-rotor configurations.

FIG. 4 shows a graph of characteristic curves. The graph in FIG. 4 indicates frequencies (pulse rates) of driving pulses along a horizontal axis and torques along a longitudinal axis. Curves A and B in the graph indicate a pull-out-torque characteristic and a pull-in-torque characteristic when t/D= 0.125, respectively. Curves C and D in the graph indicate a pull-out-torque characteristic and a pull-in-torque characteristic when the linearity characteristic is secured only by restricting the magnetomotive force of the rotor (magnet 20), respectively. It is clear from the graph that setting the ratio t/D (for example, adjusting the magnets outer diameter and the thickness of the pole teeth) to an appropriate value (for example, t/D=0.125) results in better pull-out-torque characteristics and pull-in-torque characteristics than restricting the magnetomotive force of the rotor (magnet 20).

In the stepping motor in accordance with the present embodiment, the magnitudes of the magnetomotive forces on the side of the stator (magnet) and on the side of the stator (coil), which are components of the torque output of the rotor 18, are represented by the outer diameter D of the magnet and the thickness t of the pole teeth (core). When the outer diameter of the stator 32 is 8 mm or less, it has been discovered that both of the torque characteristic and the linearity characteristic are favorable (i.e., do not deteriorate) when the ratio R (R=t/D) is, for example, between 0.121 and 0.143.

Figure 5A:
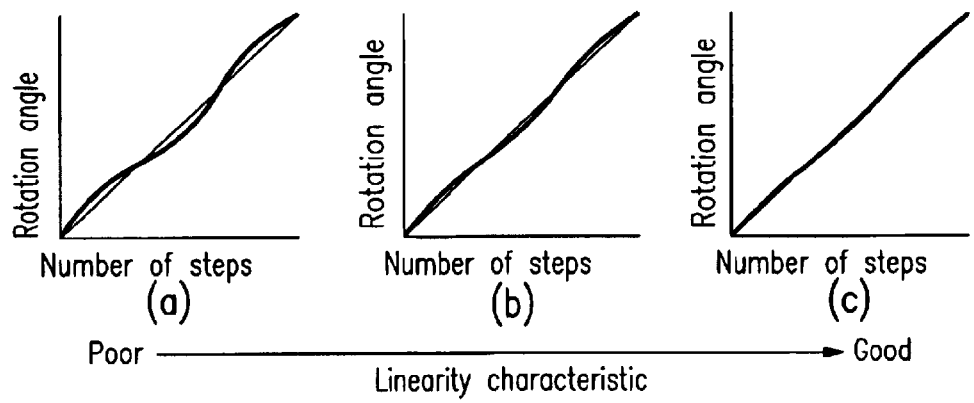
FIGS. 5A and 5B show linearity characteristics of stepping motors.
Figure 5B:
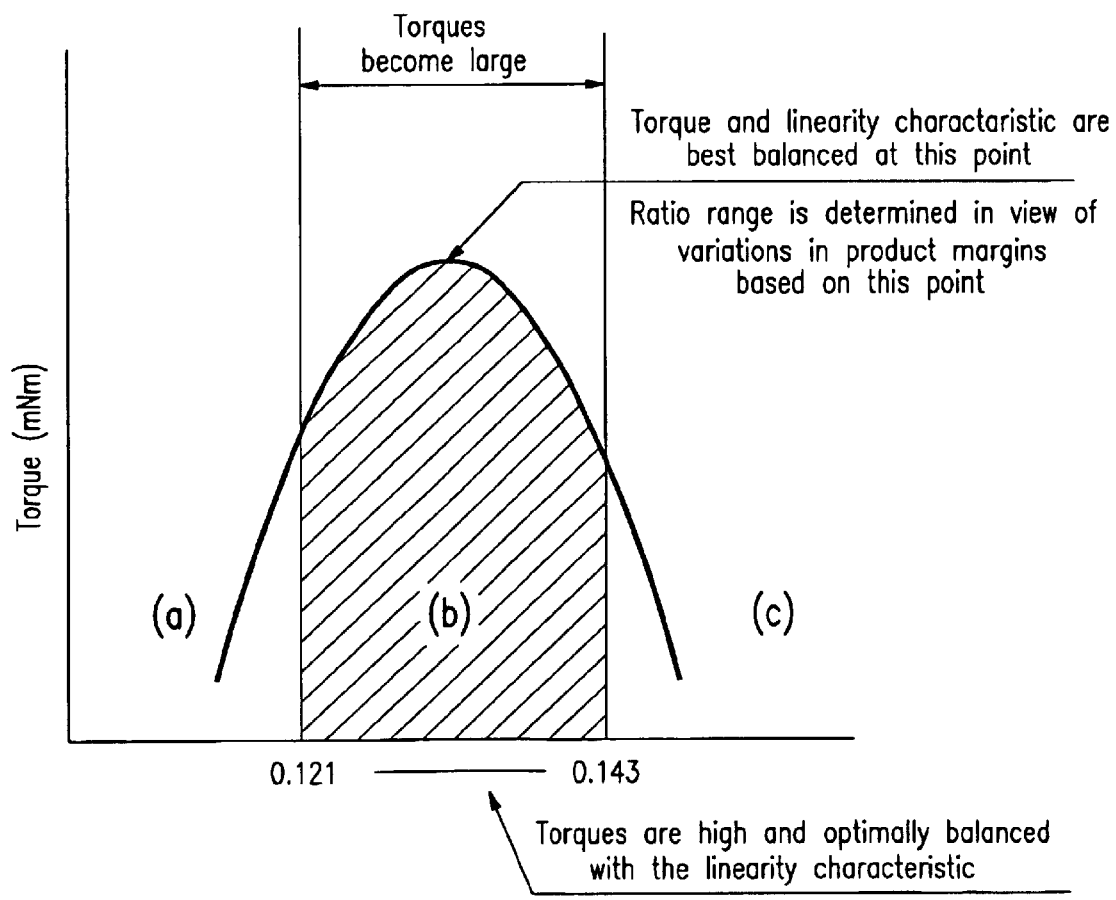

The ratio R (R=t/D) may be determined in view of variations in replacement parts that compose the stepping motor 10. For example, the ratio R (R=t/D) between 0.121 and 0.143 provides relatively large torques, as indicated in FIG. 5.

In accordance with the present invention, in a stepping motor having a stator whose outer diameter is 8 mm or less, a ratio between the thickness of pole teeth formed on a core on the side of the stator and an outer diameter of a magnet on the side of the rotor, in other words, the quotient obtained by dividing the thickness of the pole teeth by the outer diameter of the magnet, is set in a range between 0.121 and 0.143. As a result, while the stepping motor can be reduced in sizes, favorable results are obtained in both of the torque characteristic and the linearity characteristic, and therefore favorable reproduced information can be obtained without rotation irregularities.

Also, in accordance with the present invention, ratios between the magnetomotive forces of the stator and the rotor (magnet) are correlated to ratios between the thickness of the pole teeth (core) and the outer diameter of the magnet. As a result, the calculation required for determining the measurements of component parts is facilitated, and the product management is also facilitated because characteristics of motors can be determined only by measuring the sizes of the component parts.

While the description above refers to a particular embodiment of the present invention, it will be understood that many modifications may be made without departing from the spirit thereof. The accompanying claims are intended to cover each modifications as would fall within the true scope and spirit of the present invention.

The presently disclosed embodiment is therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A stepping motor comprising:
    a stator having a core with pole teeth formed therein, the pole teeth having a predetermined thickness; and
    a rotor having a magnet disposed opposing to the stator, the magnet having a predetermined outer diameter,
    wherein a quotient derived by dividing the thickness of the pole tooth by the outer diameter of the magnet is between 0.121 and 0.143.

2. A stepping motor according to claim 1, wherein an outer diameter of the stator is 8 mm or less.

3. A stepping motor according to claim 1, wherein the thickness of the pole teeth in a radial direction transverse to a rotation axis of the rotor is the same as the thickness of the core.

4. A stepping motor comprising:
    a rotor having a main shaft extending in a rotation axis and a magnet fixed on an outer circumference of the main shaft, the magnet having a predetermined outer diameter transverse to the rotation axis; and
    a stator having a core with pole teeth formed therein, wherein an inner surface of the core at the pole teeth opposes an outer circumferential surface of the magnet in a radial direction and the pole teeth has a predetermined thickness in the radial direction,
    wherein a quotient derived by dividing the thickness of the pole teeth by the outer diameter of the magnet is between 0.121 and 0.143.

5. A stepping motor according to claim 4, wherein an outer diameter of the stator is 8 mm or less.

6. A stepping motor according to claim 4, wherein the quotient derived by dividing the thickness of the pole teeth by the outer diameter of the magnet is 0.125.

* * * * *